Feb. 29, 1972　　　　　D. H. LINSON　　　　　3,645,899
MOLDED EPOXY RESIN ELECTRICAL INSULATING BODY
CONTAINING ALUMINA AND SILICA
Filed Aug. 19, 1968　　　　　　　　　　　2 Sheets-Sheet 1

INVENTOR.
DONALD H. LINSON
BY *Bosworth, Sessions,*
*Herrstrom & Cain*

ATTORNEYS

Feb. 29, 1972   D. H. LINSON   3,645,899
MOLDED EPOXY RESIN ELECTRICAL INSULATING BODY
CONTAINING ALUMINA AND SILICA
Filed Aug. 19, 1968   2 Sheets-Sheet 2

INVENTOR.
DONALD H. LINSON
BY Bosworth, Sessions,
Herrstrom & Cain
ATTORNEYS

United States Patent Office 3,645,899
Patented Feb. 29, 1972

3,645,899
MOLDED EPOXY RESIN ELECTRICAL INSULATING BODY CONTAINING ALUMINA AND SILICA
Donald H. Linson, Mansfield, Ohio, assignor to The Ohio Brass Company, Mansfield, Ohio
Filed Aug. 19, 1968, Ser. No. 753,414
Int. Cl. H01b 3/08, 3/10, 3/40
U.S. Cl. 252—63.5
4 Claims

ABSTRACT OF THE DISCLOSURE

There is provided a resinous molded insulating device, e.g. a line post insulator, having improved tracking characteristics at high voltages formed from an alicyclic diepoxy carboxylate which enables a substantial reduction in the amount of hydrated alumina contained in the resinous body over that required with other resins. The invention also relates to a method of producing these products characterized by the ability to interrupt the hardening reaction occurring with the compositions at the gel stage when the product is quite rubbery but cohesive whereby the product is removed from the mold in the partially cured state and the cure is completed outside the mold.

---

This invention relates to molded organic resinous high-voltage insulating devices, e.g. line post insulators, and to the method of making same.

BACKGROUND OF THE INVENTION

Prior efforts to develop an organic, outdoor electrical insulation product of rigid physical structure that does not track under an electrical load or arc have depended upon the use of hydrated alumina as a filler in an organic resinous composition. The amount of this filler has generally ranged from what is alleged to be as low as 20% to as high as 70% by weight of the entire composition. However, experience has shown that in prior insulators 20% of the hydrated alumina is far too low and tracking or excessive erosion at the low concentrations of hydrated alumina is experienced. Typical resin systems depend upon the bisphenol A type of epoxy resin. When hydrated alumina is used at the higher percentage to stop the tracking, other electrical and mechanical properties suffer along with increased erosion of the insulation. If the percentage of the alumina is reduced to improve the mechanical characteristics of the composition, then the epoxy resin loses its tracking resistance.

SUMMARY OF THE INVENTION

The principal object of the invention is to provid an improved organic insulating material in which electrical breakdown of the surface by tracking, creepage, or arcing is reduced or minimized.

Another object of the invention is to improve the mechanical and thermal characteristics of organic insulators embodying surface tracking-resistance materials.

Still another object of the invention is to maintain a low electrical erosion rate in organic insulating materials.

It has now been found that certain cycloaliphatic epoxy resins have properties in combination with hydrated alumina such that the very low percentages of hydrated alumina preferably about 8% and not more than about 10% together with high percentages of silica, preferably more than 50%, enable the production of an electrical insulating product that is track resistant and at the same time has good erosion resistance along with improved mechanical, thermal, electrical and weathering properties. Lower concentrations of hydrated alumina in a given formuation enable better mechanical and electrical properties.

The present invention is in the provision of an electircal insulating material comprising a cycloaliphatic diepoxy carboxylate resinous material having dispersed therethrough finely divided particles of hydrated alumina in an amount less than about 10% by weight of the entire composition and preferably more than 50% silica. The invention also contemplates an article of manufacture which is a line post insulator comprising a resinous insulator body which is cycloaliphatic diepoxy carboxylate having dispersed therethrough finely divided hydrated alumina in an amount of less than about 10% and preferably about 8% by weight and more than 50% by weight silica. It has been found that contrary to the prior art teachings very low percentages of hydrated alumina in the resin composition provide electrical insulating materials with excellent tracking prevention heretofore attainable only with much higher percentages of hydrated alumina. These electrical insulating materials also possess excellent erosion resistance and other desirable electrical and mechanical properties.

This invention thus permits a substantial reduction in the amount of hydrated alumina required for tracking prevention heretofore believed necessary.

The invention also relates to a method of forming a line post insulator comprising a process of casting the hardenable resinous composition in liquid form into a mold by introduction through the hollow stud extending from one end of said post, flowing hardenable material around a U-bolt carried in the opposite end of said mold; allowing the hardening reaction to take place for a predetermined period of time until the resinous portion is gelled and in a rubbery condition; extracting the post from the mold and completing the hardening of the resinous portion to produce a physically rigid structure externally of the mold.

DESCRIPTION OF THE DRAWINGS

The invention will be further understood by having reference to the annexed drawings, in which:

Referring now to FIG. 1, the insulator 10 is constituted as a body 11 comprising a formed monolithic mass of organic insulating material of a composition to be explained hereinafter, a pole connector 12 comprising a stud 13 and screw fastener 14, and a conductor connector 15 comprising a U-bolt 16, a metal conductor clamp 17, and screw fasteners 18 and 19. The insulator 10 is adapted to be mounted upon a conductive or insulating support member with the stud 13 received through the member and the end face 20 of the body 11 and the washer 21 compressed against the opposite sides of the member by the screw fastener 14. A line conductor, such as the cable 22, is received in the space defined by the end face 23 of the insulator body 11 and the face 24 of the clamp 17, and compressed between the insulator body and the conductor clamp by the action of the screw fasteners 18 and 19.

The insulator body 11 is constituted as a unitary mass of organic insulating material comprising a polymerized resin, as hereinafter described, formed on the exterior thereof with a plurality of insulating flanges or petticoats 25 for increasing the exterior surface leakage distance along the insulator between the conductor 22 and the support member, and for forming regions protected against deposition of conductive contaminants, rain and wind-borne contaminants, and the like.

Figure 4:
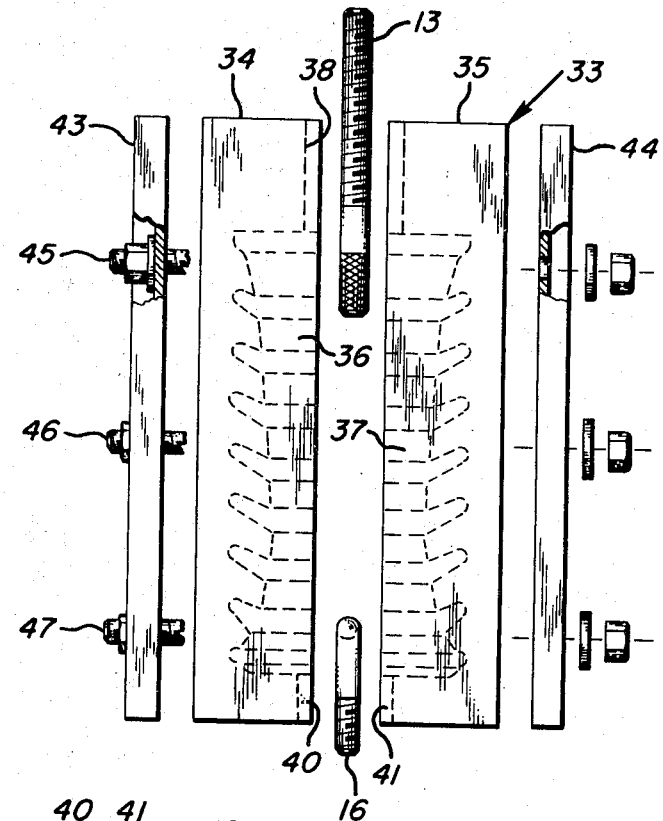
FIG. 4 is an exploded elevational view of a mold used in fabricating the line post insulator of the present invention.
Figure 5:
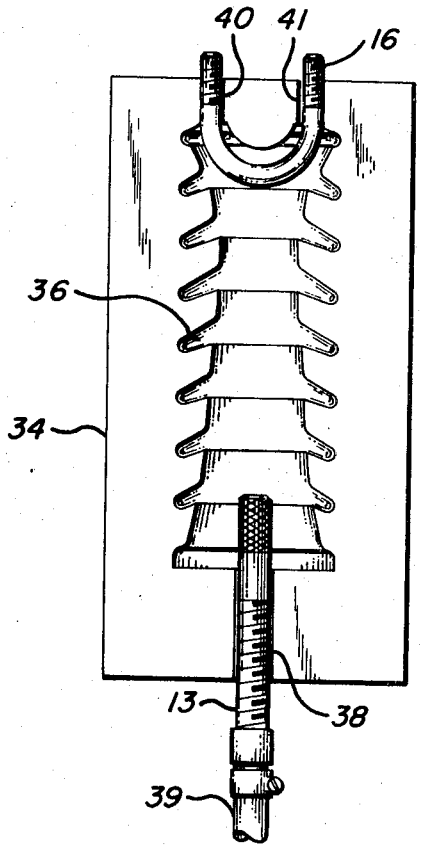
FIG. 5 is an elevational view of a mold half of the mold of FIG. 4.

The insulator body 11 is formed in a mold 33, illustrated in FIG. 4 and FIG. 5 and comprising two metal or plastic mold halves 34 and 35. The mold halves are formed with interior openings comprising the pattern of the insulator body including body openings 36 and 37, an opening 38 for receiving the hollow stud 13, and two openings 40 and 41 for receiving the U-bolt 16. Two back-up plates 43 and 44 and attachments 45, 46, and 47 are utilized for holding the mold parts 34 and 35 against each other in the conventional manner during molding operations.

In making the insulator body, the interior openings 36, 37, 38, 40 and 41 of the mold parts 34 and 35 are sprayed with a mold release compound, such as a known silicone liquid, the stud 13 and the U-bolt 16 are positioned in the openings 38, 40 and 41, and the mold parts are clamped together. The assembled mold is then placed in a vacuum chamber with the longitudinal axis of the mold directed vertically and the stud 13 at the bottom end of the mold, as shown in FIG. 5. The stud 13 is then connected to a fill pipe 39 for supplying raw resin to the interior of the mold. The vacuum chamber is then evacuated to a pressure on the order of 27 inches of mercury during the casting process.

The raw resin is supplied to the mold from a degassing chamber, the resin being supplied to the mold 33 under pressure, and the mold 33 filled until the raw resin flows from the openings 40 and 41 about the U-bolt 16. The amount of air pressure required for filling the mold depends upon the viscosity of the resin-filler mixture, and an air pressure of 15 pounds per square inch was utilized in one exemplary procedure to yield a pressure differential of about 30 pounds per square inch in the interior of the mold.

The mold is filled from the bottom up in order to insure complete filling of the petticoat openings without trapping of any gas retained in the mold after evacuation of the mold chamber. Any gases in the mold are driven upward through the mold and out of the openings 40 and 41 during the filling process.

After the mold is filled, the resin line is shut off and the vacuum maintained in the filling chamber for a short period of time, for example, on the order of 5 minutes. The filling chamber is then opened, the openings 40 and 41 are closed, the filler hose 39 is disconnected, and the mold removed from the casting chamber. The mold is then inverted to the position shown in FIG. 4 and a short piece of plastic tubing (not shown) is connected to the stud 13. The stud and plastic tubing are then filled with raw resin to provide a small fill reservoir of resin, sufficient to compensate for the reduction in volume of the resinous mass during initial curing. For this purpose, the curing of reserve resin in the stud 13 and plastic tube was retarded by wrapping the stud in a damp cloth during the first hour of the initial curing process.

The mold was then placed in an oven and the temperature maintained at 120° C. for a period of two hours to initiate a preliminary cure and gel the resinous mass in the mold. The mold was then removed from the oven, the mold parts 34 and 35 separated, and the resin body with the incorporated stud 13 and U-bolt 16 was removed from the mold.

At this stage of curing the resinous mass is only partially cured and has a rubbery character such that the flanges can be removed from the mold without damage to the flanges and without the resin sticking to the body of the mold. After removal from the mold, the insulator body is placed in an oven and finally cured at a temperature of 120° C. for a period of 16 hours.

Referring now to the epoxy resin composition of this invention, the epoxy resin that is used in producing the insulator of this invention is known as alicyclic diepoxy carboxylate. Specifically this resin is 3,4-epoxy-cyclohexylmethyl - 3,4 - epoxy-cyclohexanecarboxylate having an epoxide equivalent weight of 126 to 140 and having the structural formula:

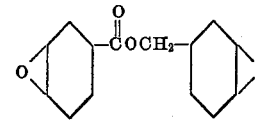

The resin is sold commercially as Ciba's resin No. CY 179. The composition from which the insulators of this invention are produced includes the above resin and a flexing agent such as polypropylene glycol having a molecular weight in the order of 975 to 1075. A coupling agent is utilized to improve the bond between the filler and the epoxy resin and helps retain the physical properties of the insulator body during its exposure to its service environment. The coupling agent preferably is glycidoxypropyltrimethoxy silane. Hexahydrophthalic anhydride is used as a hardener in the composition. An accelerator is also included in this composition which is preferably sodium alcoholate. Other flexing and coupling agents, hardeners and accelerators well known to those skilled in the art may be utilized without departing from this invention.

A portion of the filler for the resin is hydrated alumina preferably having a particle size of one micron or less. The hydrated alumina is present in an amount less than about 10% based on the total weight of the composition and preferably about 8% by weight. The percentages referred to herein are based on the total weight of the composition. The remainder and major portion of the filler is silica, as for example, quartz of a pure white crystalline form sized so that approximately 50% will pass through a 325 mesh screen. The silica is present in an amount more than 50% by weight and in the preferred embodiment about 55% by weight.

Reference will now be had to illustrative examples of the composition of this invention.

Example 1

| | Parts |
|---|---|
| Resin | 100 |
| Flexing agent | 40 |
| Coupling agent | 3 |
| Hardener | 105 |
| Accelerator | 10 |
| Quartz | 380 |
| Hydrated alumina | 55 |

Example 2

| | Parts |
|---|---|
| Resin | 100 |
| Flexing agent | 20 |
| Coupling agent | 1 |
| Hardener | 105 |
| Accelerator | 10 |
| Quartz | 364 |
| Hydrated alumina | 52 |

The components of the above examples are for ease of description referred to by their function. They are the compounds described hereinbefore.

Figure 1:
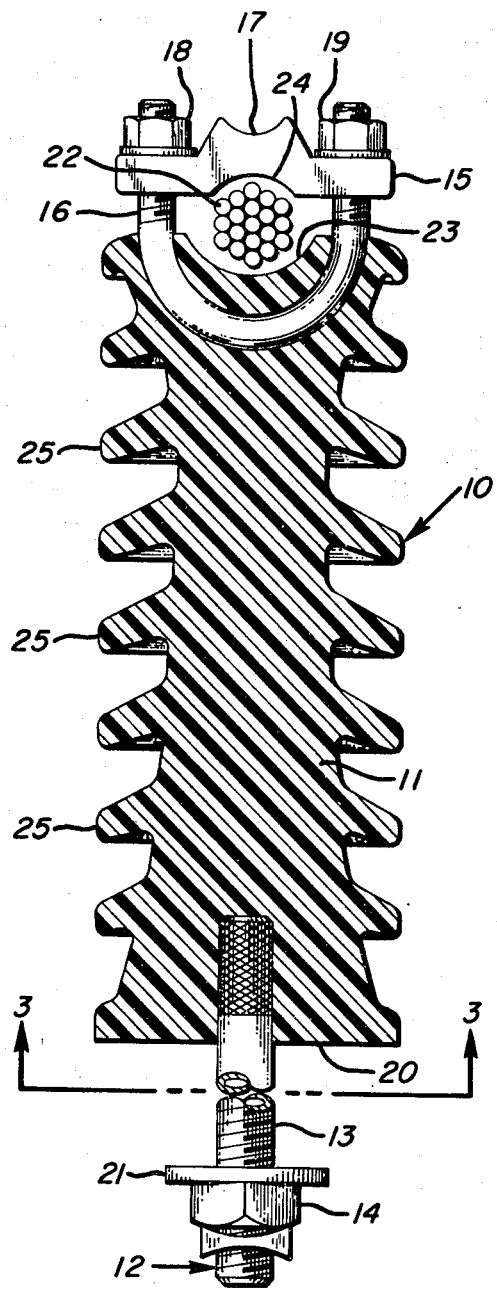
FIG. 1 is a partially sectioned elevational view of a molded epoxy resin line post insulator formed from the compositions of this invention and by the process of this invention.
Figure 2:
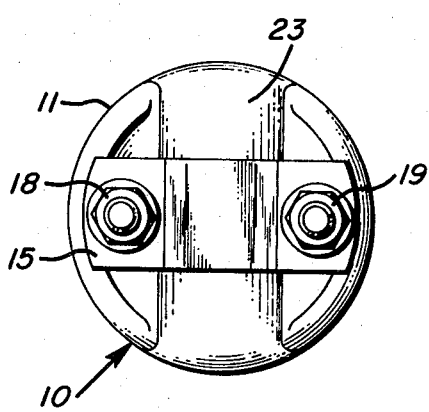
FIG. 2 is a top plan view of the line post insulator of FIG. 1.
Figure 3:
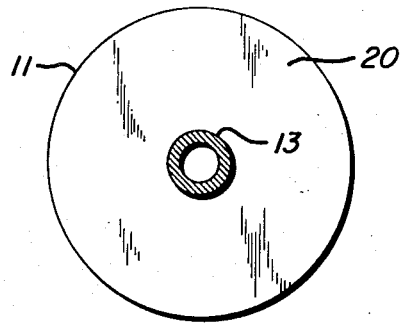
FIG. 3 is a bottom plan view of the insulator of FIG. 1 taken along line 3—3 of FIG. 1.

The compositions of the above two examples were mixed in conventional manner and formed into the electrical insulator of FIG. 1 by the method described hereinbefore. After curing the insulators were found to exhibit excellent track and erosion resistance. These insulators also possessed a tensile strength of over 9,000 p.s.i. and exhibited excellent weathering characteristics. It was found that if the percentage by weight of the total resin composition of hydrated alumina was increased to 20% or above the insulators retained their track resistance but lost substantial amounts of their erosion resistance. If the percentage by weight of silica was reduced to less than 50%, the thermal conductivity of the insulator was reduced, which enabled the maximum localized or hot spot temperature to rise to a point where carbonization could occur. The composition of this invention keeps the hot spot temperature on the surface where arcing may occur to below the carbonization threshold of the polymer.

It can be seen from the foregoing that these specific resin compositions wherein less than about 10% by weight of hydrated alumina and more than 50% by weight of silica are utilized provide excellent electric insulators which may be produced by the above described method. It should be apparent that various modifications may be made in this invention without departing from the scope of the appended claims.

What is claimed is:

1. In an electric insulating body comprising a polymerized alicyclic diepoxy carboxylate resin, the improvements comprising an inorganic filler comprising less than about 10% by weight of the body of hydrated alumina having a particle size of one micron or less and more than 50% by weight of the body of finely divided silica.

2. An electric insulator according to claim 1 wherein said filler includes about 8% by weight of hydrated alumina.

3. An electric insulator composition comprising a polymerized resin mass including alicyclic diepoxy carboxylate, polypropylene glycol, glycidoxy - propyltrimethoxy silane, hexahydrophthalic anhydride and sodium alcoholate, and an inorganic filler comprising at least 50% by weight of the total composition of silica having a particle size such that approximately 50% will pass through a 325 mesh screen and less than 10% by weight of hydrated alumina having a particle size of one micron or less.

4. In an electric insulator for a line conductor, an insulating body having a top end and a bottom end composed of a monolithic solid mass of track-resistant and erosion-resistant plastic material comprising a polymerizable alicyclic diepoxy carboxylate resin, the improvements comprising an inorganic filler comprising less than about 10% by weight of the body of hydrated alumina having a particle size of one micron or less and more than 50% by weight of the body of silica having a particle size such that approximately 50% will pass through a 325 mesh screen, a plurality of annular flanges spaced along the exterior of the body, each comprising an insulating part integral with the body and extending at an angle less than perpendicular to the longitudinal axis of the body at the bottom end thereof, an end face at the bottom end of the insulating body shaped for engagement with a support member, an end face at the top end of the insulating body shaped for engagement with a line conductor, means in the body at the said one end thereof for connecting the insulator to the support member, and means in in the body at the said one end thereof for connecting the insulator to the support member, and means in the the body at the said remaining end thereof for securing the line conductor to the insulator.

References Cited
UNITED STATES PATENTS

| | | | |
|---|---|---|---|
| 2,890,209 | 6/1959 | Phillips | 260—78.3 |
| 2,997,527 | 8/1961 | Kessel | 260—37 X |
| 3,021,234 | 2/1962 | Casement | 260—37 X |
| 3,247,285 | 4/1966 | Belanger | 260—2 X |
| 3,318,995 | 5/1967 | Buckley | 174—142 |
| 3,366,603 | 1/1968 | Klaus | 260—37 X |
| 3,433,893 | 3/1969 | Hofmann et al. | 260—37 X |
| 3,434,087 | 3/1969 | Hofmann | 260—37 X |
| 3,470,129 | 9/1969 | Ernst | 260—37 |

JOHN T. GOOLKASIAN, Primary Examiner

M. E. McCAMISH, Assistant Examiner

U.S. Cl. X.R.

117—232; 174—142; 252—63.7, 64; 260—37 EP